(12) United States Patent
Ouchi

(10) Patent No.: US 7,299,102 B2
(45) Date of Patent: Nov. 20, 2007

(54) METHOD AND SYSTEM FOR ENGINEERING CHANGE IMPLEMENTATION

(76) Inventor: Norman Ken Ouchi, P.O. Box 20111, San Jose, CA (US) 95160

( * ) Notice: Subject to any disclaimer, the term of this patent is extended or adjusted under 35 U.S.C. 154(b) by 48 days.

(21) Appl. No.: 11/001,943

(22) Filed: Dec. 2, 2004

(65) Prior Publication Data

US 2006/0122721 A1   Jun. 8, 2006

(51) Int. Cl.
*G06F 19/00* (2006.01)

(52) U.S. Cl. .................................................... 700/105

(58) Field of Classification Search ................. 700/105
See application file for complete search history.

(56) References Cited

U.S. PATENT DOCUMENTS

| | | | |
|---|---|---|---|
| 3,971,000 A | 7/1976 | Cromwell | 700/84 |
| 4,303,973 A | 12/1981 | Williamson et al. | 700/84 |
| 4,443,861 A | 4/1984 | Slater | 710/8 |
| 4,489,364 A | 12/1984 | Chance et al. | 361/737 |
| 4,546,413 A | 10/1985 | Feinberg et al. | 361/778 |
| 4,652,974 A | 3/1987 | Ryan | 361/739 |
| 4,706,165 A | 11/1987 | Takenaka et al. | 361/767 |
| 4,746,815 A | 5/1988 | Bhatia et al. | 361/728 |
| 4,803,595 A | 2/1989 | Kraus et al. | 361/784 |
| 4,887,206 A | 12/1989 | Natarajan | 705/29 |
| 4,922,377 A | 5/1990 | Matsumoto et al. | 361/705 |
| 5,060,116 A | 10/1991 | Grobman et al. | 361/792 |
| 5,181,317 A | 1/1993 | Nishihara et al. | 29/401.1 |
| 5,184,284 A | 2/1993 | Ashelin et al. | 361/783 |
| 5,191,534 A * | 3/1993 | Orr et al. | 700/105 |
| 5,243,140 A | 9/1993 | Bhatia et al. | 174/254 |
| 5,294,754 A | 3/1994 | Wu | 174/255 |
| 5,307,261 A | 4/1994 | Maki et al. | 705/29 |
| 5,315,509 A | 5/1994 | Natarajan | 705/28 |

(Continued)

OTHER PUBLICATIONS

"Engineering Change: Too Important To Leave To The Engineers"—Frank et al, Presented at the APICS International Conference 1980 and at the 1st World Congress at Vienna Austria, 1985.*

(Continued)

*Primary Examiner*—Michael D. Masinick

(57) ABSTRACT

In the present invention, a product is manufactured in a manufacturing process controlled and tracked using a manufacturing execution system or MES. An engineering change is made to the product specification while units of the product are in the manufacturing process. The product unit is reworked to match the changed specification. The engineering change implementation function of the manufacturing execution system identifies the products units to be reworked, provides instructions for the rework, and tracks that all affected product units are reworked to the changed specification.

19 Claims, 2 Drawing Sheets

U.S. PATENT DOCUMENTS

| | | | |
|---|---|---|---|
| 5,761,079 A | 6/1998 | Drumm | 716/11 |
| 5,864,875 A | 1/1999 | Van Huben et al. | 707/200 |
| 5,953,236 A | 9/1999 | Hossain et al. | 716/6 |
| 5,970,503 A | 10/1999 | Eisenberg | 707/203 |
| 6,014,506 A | 1/2000 | Hossain et al. | 716/11 |
| 6,112,130 A | 8/2000 | Fukuda et al. | 700/121 |
| 6,167,401 A | 12/2000 | Csipkes et al. | 707/10 |
| 6,243,717 B1 | 6/2001 | Gordon et al. | 707/203 |
| 6,272,665 B1 | 8/2001 | Johnson et al. | 716/3 |
| 6,651,239 B1 | 11/2003 | Nikitin et al. | 716/18 |
| 6,684,121 B1 | 1/2004 | Lu et al. | 700/108 |
| 6,845,280 B1 * | 1/2005 | Rives et al. | 700/121 |
| 7,069,100 B2 * | 6/2006 | Monette et al. | 700/116 |
| 2003/0063447 A1 | 4/2003 | Cwik et al. | 361/767 |
| 2003/0078975 A1 * | 4/2003 | Ouchi | 709/205 |
| 2003/0102367 A1 * | 6/2003 | Monette et al. | 235/376 |
| 2003/0105541 A1 | 6/2003 | Hsu et al. | 700/100 |
| 2004/0039665 A1 | 2/2004 | Ouchi | 705/28 |
| 2004/0225390 A1 | 11/2004 | Keller et al. | 700/95 |

OTHER PUBLICATIONS

"A Comparative Study Of Engineering Change Management In Three Swedish Engineering Companies" -Pikosz et al, Chalmers University of Technology, Sweden.*

"Solumina: Engineering Changes" Web page, printed from The WayBack Machine denoting a Last Change date of Jan. 14, 2002.*

* cited by examiner

METHOD AND SYSTEM FOR ENGINEERING CHANGE IMPLEMENTATION

CROSS-REFERENCE TO RELATED APPLICATIONS

None

STATEMENT REGARDING FEDERALLY SPONSORED RESEARCH OR DEVELOPMENT

None

FIELD OF THE INVENTION

This invention is related to manufacturing execution systems and in particular to the control and tracking of engineering changes made to a product while units of the product are in the manufacturing process. An engineering change is a change to the specification of a product that results in a change in the manufactured product units.

BRIEF SUMMARY OF THE INVENTION

In the present invention, a product is manufactured in a manufacturing process controlled and tracked using a manufacturing execution system or MES. An engineering change is made to the product specification while units of the product are in the manufacturing process. The product unit is reworked to match the changed specification. The engineering change implementation function of the manufacturing execution system identifies the products units to be reworked, provides instructions for the rework, and tracks that all affected product units are reworked to the changed specification.

BACKGROUND OF THE INVENTION

Once a product is designed and manufactured, it may under go modifications that are implemented in subsequent units that are manufactured. Changes are made to make the product safer, lower cost, add functions, etc. to meet changes in the market. These changes are called Engineering Changes because the change usually requires a change in the design specification by engineering. A change to the product usually changes the manufacturing process that produces the product. To assure that changes to designed functions of the product are reflected in the manufactured product, most organizations use an engineering change control process that requires that the manufacturing process changes are in effect before the changed product is manufactured. Each manufactured product may be tracked by a designation of the engineering change to which the product was manufactured. The item identifier, called a part number may be changed or a secondary identifier called a revision or engineering change level may be changed to signify that the product has been changed from the previous design of the product. Many processes and systems have been developed to assure that the manufacturing process changes are made to reflect the engineering change before the product is manufactured.

Many of these changes are unanticipated and there may be units of the product in the manufacturing process when an engineering change is contemplated or implemented. The product units may be allowed to complete the manufacturing process and shipped at the original design. However, it may be economically feasible to modify (rework) units in the manufacturing process so that these units meet the changed requirements. The prior art describes for some products, especially semiconductor products, where the product design, with in limits, can accommodate engineering changes without major reprocessing of the product.

However, the implementation of the engineering change to product units in the manufacturing process have been controlled and tracked manually. With a manual process, there are "escapes" where product units that should have been reworked are not, product units that were thought to have been reworked are not, and product units that should not be reworked are reworked. With a manual process, the wrong rework processes may used to rework product units. The rework process may be dependent on the state of unit in the manufacturing process. A unit that has just started may require just a change in a component in the bin used to assemble the product. A unit later in the process may require a component to be removed and another assembled in its place. A unit near completion, for example after encapsulation, may not be reworked. A unit may continue in the original manufacturing process to a specified point, then reworked to the engineering change specification. After a unit is reworked, the unit may require a different manufacturing process than before rework. For example, a test to validate the rework is executed.

The part identifier of a unit is associated with the engineering specification to which it was manufactured. The part identifier is usually called a part number and may also include a secondary identifier called Engineering Change level (E/C level) or revision level. When a unit built to a first engineering specification is reworked to a second engineering specification, the part identifier for the unit is changed to that associated with the second engineering specification.

The MES uses work order to associate a part identifier and quantity with units to be manufactured. The MES also associates a route, a step-by-step sequence of manufacturing process steps, to a work order as the operational description of the manufacturing process. The MES uses the route to control and track the units in the manufacturing process.

When an engineering change is contemplated and designed, product units may continue to be manufactured. These units may not be useable or may require more rework than if stopped when the engineering change was contemplated. Stopping the manufacturing process will provide the opportunity to assess the quantity of product in the manufacturing process and the state of the units in the process. An economic decision can be made as to if and when the engineering change can be implemented. It may be desirable to permit units to proceed to a specified point in the manufacturing process before stopping.

The product is controlled and tracked in the manufacturing process using a manufacturing execution system, MES, or shopfloor system. The present invention is a function of an MES to assure accurate implementation of an engineering change by:

1) Identifying the product units for implementation of the engineering change
2) Stopping the product in the manufacturing process while allowing other products to continue manufacturing. The stopping point in the manufacturing process can be specified
3) Proving a view of the units in the process so that an assessment of the impact engineering change can be made. The state of each unit or group of units can be determined so that rework instruction can be developed dependent on the state of the unit to be reworked.

4) Providing the rework instructions or process to implement the engineering change to each unit. The rework instructions may be a function of the state of manufacturing process of the unit. The rework can be applied at a specified point in the manufacturing process.
5) Tracking when a unit is reworked. Assure that all units to be reworked are reworked
6) Providing the manufacturing process for the unit after rework.
7) With each unit reworked, in the associated work orders, decrementing the number of units with the original product identifier and incrementing the number of units with the engineering change product identifier.

DESCRIPTION OF THE INVENTION

Figure 1:
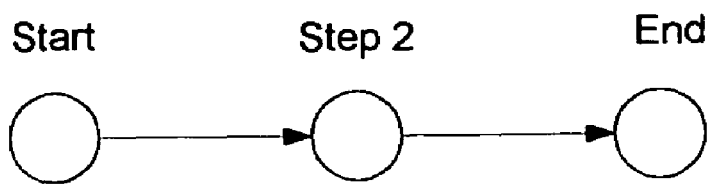
FIG. 1 illustrates a first route for manufacturing a product.

A manufacturing execution system (MES) uses a route, a step-by-step sequence that defines a manufacturing process. A step in the route defines a manufacturing process step and the work center at which the step is executed. The step provides operator instructions, parameters or programs for process equipment used at the work center, etc. to execute the process step. At the completion of a process step, the MES provides direction to perform the next process step. The next process step may include an instruction to move the unit to the next work center in the route. A unit is identified by a barcode or other machine-readable identifier or by other means such as a paper traveler with identifying information. Reading the unit's barcode or entering the identifying information selects the unit in the MES. The MES tracks units by the step in the route at which the unit is selected and can determine if the unit is executing the process steps in the proper sequence. The MES can notify if a unit is not following the sequence. The completion of a step can also be tracked. Most MES provide a real time view of the "Work in process" or WIP by product or by work order for a product. A route can be diagrammed as a directed graph where a node represents a step in the route and the arrow designates the next node and step in the route. FIG. 1 illustrates a three-step route that provides Start, Step 2, and End steps.

Figure 2:
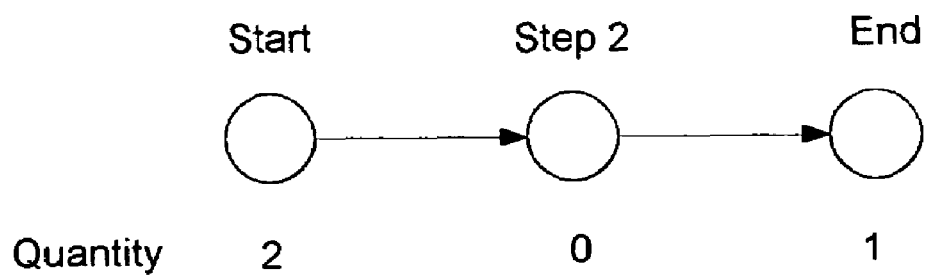
FIG. 2 illustrates the first route with the quantity of units at each work center.
Figure 3:
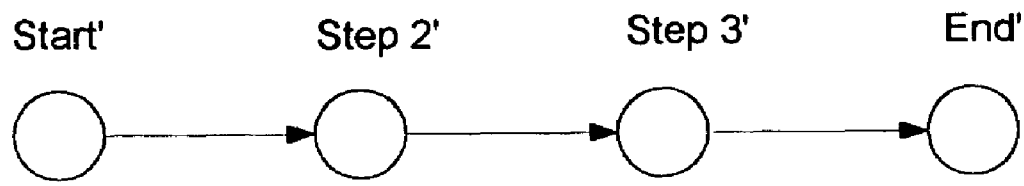
FIG. 3 illustrates a second route for the manufacture of the product after rework
Figure 4:
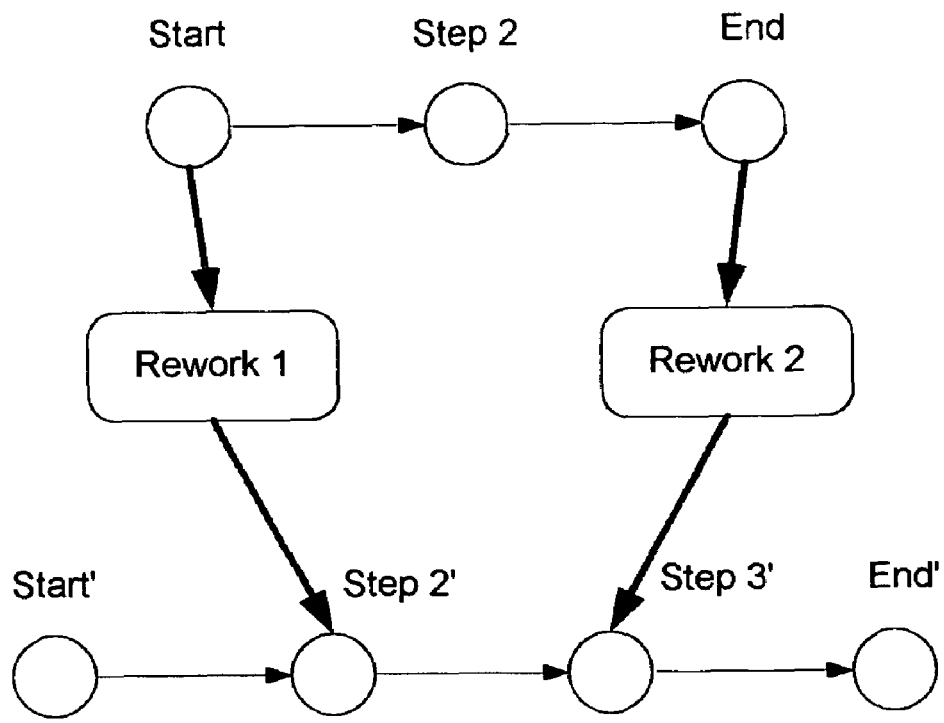
FIG. 4 illustrates the first route with rework instructions and the second route to control the manufacturing process for the product after rework.
Figure 5:
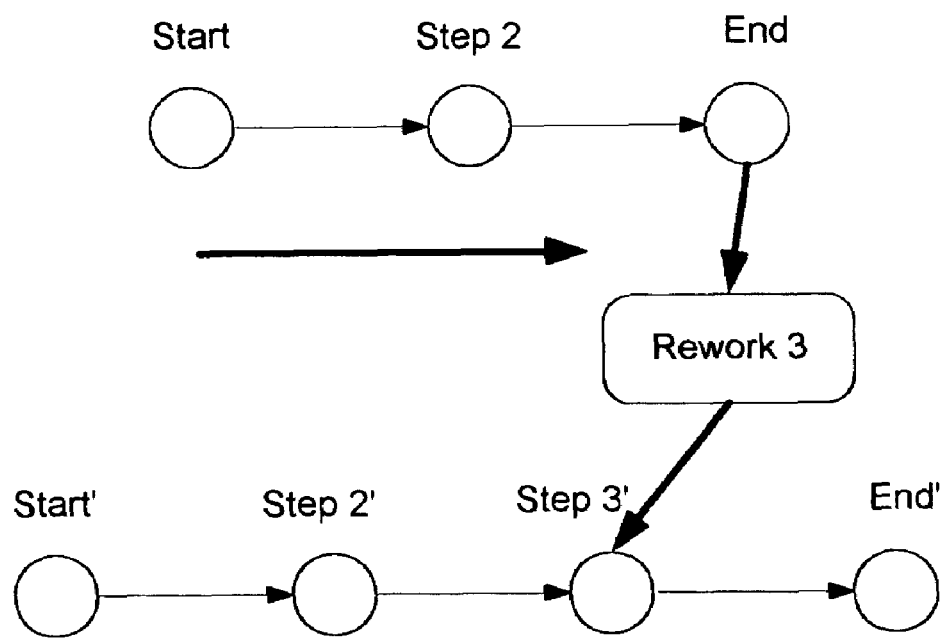
FIG. 5 illustrates the first route with rework instructions and the second route to control the manufacturing process for the product after rework where the rework is applied at a specified work center in the first route.

The Engineering Change Implementation function of the MES provides:

1) A product stop capability where a specified product in the manufacturing processes can be stopped. When the unit is selected, the MES displays a message to the operator not to process the unit. The stopping point can be specified as a step in the route.
2) A view of the route with the quantity of the product at each process step and workcenter. This can be used to determine the work centers at which product is located and the quantity at each work center. FIG. 2 illustrates the quantity at each process step where some process steps may not have units. In FIG. 2, Start has two units, Step 2 has no units, and End has one unit.
3) For each work center with units, a means to create rework instructions for the product units and assign a step and second work center in a second route. The second route provides the process for the unit after the rework has been completed. FIG. 3 illustrates a second route with four process steps: Start', Step 2', Step 3', and End'. FIG. 4 illustrates the first route, rework instructions (Rework 1 Instruction and Rework 2 Instruction) for each process step in the first route that has units, and steps in the second route to receive the units when the rework has been completed. In FIG. 4, the units at Start in the first route are reworked using Rework 1 instructions and when complete transferred to Step 2' in the second route. These units are then directed to the process steps at Step 3' and End'. The unit at End in the first route is reworked using Rework 2 instructions and when complete transferred to Step 3' in the second route. The unit is then directed to the End' process step.
4) A unit may not be reworked at the work center at which it was when the Engineering Change was started. It may be desirable for a unit to continue using the first route to a specified step where the rework is performed. FIG. 5 illustrates the first route, rework instructions, Rework 3 Instructions, at the End process step, and the second route. A unit at the Start process step in the first route continues on the first route through the Step 2 process step and to the End process step. At the End process step, the unit is reworked using Rework 3 Instructions and when complete transferred to Step 3' in the second route. The unit is then directed to the End' process step.
5) An Engineering Change start capability such that when a product unit is selected, the work center operator is provided the rework instructions for the product at that work center and when the rework has been completed, the product unit is transferred to the second route at the second process step. A work order associates a product identifier quantity, and route. The units are initially associated with a first work order with a first quantity. The reworked units are associated with a second work order with an initial quantity of zero (since no units are reworked initially). When a unit is reworked the quantity of units associated with the first work order is reduced by one and the quantity of units associated with the second work order is increased by one. If all units in the first work order are reworked, the quantity in the first work order is zero and the quantity in the second work order is the first quantity.

It is noted that the first route and second route need not be different; the first route can be used as the route after reworking the unit.

The Engineering Change Implementation function assures that only the product units to be reworked are reworked; that the proper rework instructions were provided; units that have been reworked are tracked using the second route with the process to follow rework and the units that have not been reworked are tracked using the original route. The quantity of units for the second work order tracks the number of units reworked and the quantity of units for the original work order tracks the number of units that have not been reworked.

DESCRIPTION OF A PREFERRED EMBODIMENT

The route that describes the step-by-step manufacturing process can be implemented as a linked list in a relational database system as illustrated in Table 1.

TABLE 1

Route Table

| Route Identifier | Current Step | Work Center | Next Step | Instructions |
|---|---|---|---|---|
| Route 1 | Start | Work Center 1 | Step 2 | Instruction 1 |
| Route 1 | Step 2 | Work Center 2 | End | Instruction 2 |
| Route 1 | End | Work Center 3 | | Instruction 3 |

A row in the Route Table includes a Route Identifier field to distinguish rows for different routes. A Current Step field that identifies the step in the route, a Work Center field that identifies the work center associated with the process step, a Next Step field that identifies the next step in the route, and an Instructions field that identifies the instructions that describes the process step to be executed at the work center. The beginning of the route is identified by "Start" and the end of the route is identified by "End" in the Current Step field.

The current position for a product unit is maintained in a Product Unit Route Position Table.

TABLE 2

Product Unit Route Position Table

| Unit Identifier | Route Identifier | Current Step |
|---|---|---|
| Barcode 1 | Route 1 | Start |
| Barcode 2 | Route 1 | End |
| Barcode 3 | Route 1 | Start |

The Product Unit Route Position Table includes a Unit Identifier field with the barcode or other identifier for a product unit; a Route Identifier field to indicate the route used for the product unit and a Current Step field that indicates the position of the unit in the route. The manufacture of a unit begins with a row created in the Product Unit Route Position Table where the unit barcode is entered into the Unit Identifier field, the route for the process is entered into the Route Identifier field, and the Current Step field is initialized to "Start" to begin the route. In the example, when the unit with Barcode 1 is selected, the MES program selects the row from the Product Unit Route Position Table with Unit Identifier Barcode 1. The MES program selects the row in the Route Table for Route Identifier Route 1 and Current Step Start. The MES program can validate that the unit with identifier Barcode 1 is at Work Center 1. Instruction 1 is provided to the work center. When the process step is completed, the Current Step field in the Product Unit Route Position row for Barcode 1 is updated to the contents of the Next Step field: Step 2 and the work center is the work center for the row with the Current Step field Step 2: Work Center 2. Work Center 1 is directed to move Barcode 1 to Work Center 2.

Adding a field to the rows in the Product Unit Route Position Table enables the Engineering Change Implementation function. Table 3 illustrates the augmented column called E/C Implementation.

TABLE 3

Product Unit Route Position with Engineering Change Implementation Table

| Unit Identifier | Route Identifier | Current Step | E/C Implementation |
|---|---|---|---|
| Barcode 1 | Route 1 | Start | E/C Rework 1 |
| Barcode 2 | Route 1 | End | E/C Rework 2 |
| Barcode 3 | Route 1 | Start | E/C Rework 1 |

The E/C Implementation field can contain either a "Stop" flag or a key to a row in the E/C Rework Table. If the E/C Implementation field is blank, the MES program processes the unit as described earlier without Engineering Change Implementation. If the E/C Implementation field is set to "Stop", the MES program displays a message at the work center to stop operations on the unit. This field may be used to stop the manufacturing process for a set of units for other than hold for an Engineering Change assessment and planning. For example, the "Stop" could also be used to stop the line due to a quality problem or a work center not operational. The "Stop" can be applied selectively so that only a specified set of units is affected.

When not blank or set to "Stop", the E/C Rework field is used to select a row in the E/C Rework Table, illustrated as Table 4. A row in the E/C Rework Table provides the Route and process step for a unit when the rework instructions have been completed and the Rework Instructions. The MES program selects the row corresponding to the barcode or identifier of a unit. If the E/C Implementation field is not blank or set to "Stop", then the MES program uses the value to select a row in the E/C Rework Table to present the Rework instructions and when completed, to transfer the unit to the route and step of the receiving route by inserting the values in the E/C Rework Table E/C Route and E/C Step fields into the Route Identifier and Current Step fields of the Product Unit Route Position with Engineering Change Implementation for the row corresponding to the barcode, Unit Identifier field. The E/C Implementation is set to blank to indicate that the E/C Implementation process for the unit has been completed.

TABLE 4

E/C Rework Table

| E/C Rework | E/C Route | E/C Step | Rework Instructions |
|---|---|---|---|
| E/C Rework 1 | Route 2 | Step 2' | Rework 1 |
| E/C Rework 2 | Route 2 | Step 3' | Rework 2 |
| E/C Rework 3 | Route 2 | Step 3' | Rework 3 |

The work order associates the part identifier (part number and E/C level) of a product, the route to manufacture the product and quantity. As a unit is reworked the quantity for the work order for the original part identifier is decreased by one and the quantity for the work order for the reworked part identifier is increased by one.

TABLE 5

Work Order Table

| Work Order | Route Identifier | Part Number | E/C Level | Quantity |
|---|---|---|---|---|
| Work Order 1 | Route 1 | Part Number 1 | E/C Level 1 | N |
| Work Order 2 | Route 2 | Part Number 2 | E/C Level 2 | M |

In the example, Barcode 1 is selected. The MES program selects the row with Barcode 1 in the Unit Identifier field. The MES program detects that the E/C Implementation filed is E/C Rework 1. The MES program selects from the E/C Rework Table the row where E/C Rework 1 is in the E/C Rework field. The MES program provides Rework 1 as the rework instruction. When the work center indicates that the rework instructions are completed, the MES program inserts Route 2 and Step 2' into the Route Identifier and Current Step fields, clears the E/C Implementation filed for the row with Barcode 1 in the Unit Identifier field and decrements the Quantity field for Work Order 1 to N−1 and increments the Quantity field for Work Order 2 to M+1. This indicates a decrease in quantity for Part Number 1 E/C Level 1 by one and an increase for Part Number 2 E/C Level 2 by one.

It may be desirable for a unit to proceed on the first route to a specified process step before stopping or implementing the Engineering Change. The Product Unit Route Position with Engineering Change Implementation Table, Table 3, is augmented with the Implementation Step field with the route step to either stop or implement the engineering change. Table 6 is the Augmented Product Unit Route Position with Engineering Change Implementation Table.

TABLE 6

Augmented Product Unit Route Position with with Engineering Change Implementation Table

| Unit Identifier | Route Identifier | Current Step | E/C Implementation | Implement Step |
| --- | --- | --- | --- | --- |
| Barcode 1 | Route 1 | Start | E/C Rework 3 | End |
| Barcode 2 | Route 1 | End | E/C Rework 3 | End |
| Barcode 3 | Route 1 | Start | E/C Rework 3 | End |

With the contents of Table 6, each unit will be processed using Route 1 until it reaches the process step designated in the Implement Step field: End. When a unit reaches the End process step, Rework 3 instructions are displayed. When the Rework 3 Instructions are completed, the unit is transferred to Route 2 at Step 3'. The next process step is End' in Route 2.

As a process example, when Barcode 1 is selected, the MES program selects the row with the Unit Identifier matching Barcode 1. The unit is at Route 1 Start process step. The Implement Step is End. Since the Current Step does not match the Implement Step, the MES processes the unit without any Engineering Change process and the Current Step field is updated to Step 2. When selected again, MES program determines that the Current Step does not equal the value in the Implement Step field and the unit is again processed without any Engineering Change process and the Current Step field is updated to End. When selected again, the MES program detects that the Current Step field matches the Implement Step field. The MES program selects the E/C Implementation field for the row. If the value were Stop, the MES program would display a message to stop processing the unit. In the example, a link to E/C Rework 3 in Table 4 is provided and the MES program displays the Rework 3 instruction. After Rework 3 instruction is completed, the MES program updates the Route Identifier field with Route 2 and the Current Step filed with Step 3', and decrements the Quantity field for Work Order 1 to N−1 and increments the Quantity field for Work Order 2 to M+1.

The relational database can be a commercial relational database from Oracle, IBM, Microsoft and other providers. The MES program can be written in a wide variety of languages such as C, C++, Java, or Visual Basic. The MES program and relational database may execute on commercial hardware such as Intel based computers, SUN, IBM, or HP computers. The work centers are connected to the computers with the MES program and relational database using a LAN, a WAN, a wireless LAN, the Internet, or other electronic interconnection. One skilled in the art may find other alternative means of implementing the MES program such that it provides the functions to control and track Engineering Change Implementation in a manufacturing process.

I claim:

1. A method for implementing an engineering change on a unit of a product in a manufacturing process controlled by a Manufacturing Execution System (MES) where the manufacturing process without an engineering change implementation function is specified by a first MES route, a sequence of process steps wherein the method comprises the steps of:
   beginning the manufacture of a first quantity of units using the first MES route;
   determining than an engineering change is required for the units;
   identifying a first process step in the first MES route to implement the engineering change by setting a first E/C rework identifier for the first process step in the MES;
   providing a first E/C rework process associated with the first E/C rework identifier;
   such that the MES determines a unit is at the first process step, including scanning a barcode identifying the unit, determines from the first E/C rework identifier that the engineering change is to be applied, and provides the first E/C rework process associated with the first E/C rework identifier to implement the engineering change and after the first E/C rework process has been completed, sets an indicator in the MES that the engineering change has been applied on the unit.

2. The method of claim 1, wherein the MES further provides a product stop function such that all units of the product are directed to hold at their current process step or stop at a specified process step.

3. The method of claim 1, wherein the MES further provides the count of the units at each process step which require the engineering change.

4. The method of claim 1, wherein a second MES route is provided with initial quantity of zero such that the MES transfers the unit to the second MES route after implementing the engineering change and the quantity of units for the first route is decremented by one and the quantity of units for the second route is incremented by one.

5. The method of claim 1, wherein the method further provides a first field containing the number of units of a product without the engineering change and a second field containing the number of units with the engineering change such that after implementing the engineering change on the unit, the first field for units without the engineering change is decremented and the second field for units with the engineering change is incremented.

6. The method of claim 1, wherein the method further provides:
   identifying a second process step for applying the engineering change at a latter point in the first route by setting a second E/C rework for the second process step;
   providing a second E/C rework process associated with the second E/C rework identifier; such that the MES determines a unit is at the second process step, determines the second E/C rework identifier and provides the second E/C rework process associated with the second E/C rework identifier to implement the engineering change on the unit and at the completion of the second E/C rework process sets an indicator in the MES that the engineering change has been applied to the unit.

7. The method of claim 1, wherein the MES further tracks a unit as not having the engineering change and after implementing the engineering change, tracks the unit as having the engineering change.

8. The method of claim 1, wherein the unit has a first part identifier, including part number and revision level; in the MES before the implementation of the engineering change process and is assigned a second part identifier in the MES after the implementation of the engineering change process and replacing the first part identifier.

9. A method for implementing an Engineering Change for a unit with a first part identifier, including part number and revision level; manufactured in a process controlled by a route directed Manufacturing Execution System (MES) during the manufacturing process; the method comprising:

defining a first route, a sequence of process steps, to manufacture the unit without an engineering change;

starting the manufacturing process for a first quantity of units using the first route;

identifying an engineering change to be implemented on the units;

identifying a first process step in the first route at which the engineering change is to be implemented by setting a first E/C rework ID for the first process step detectable by the MES;

identifying a second part identifier to be assigned to the unit after the engineering change is implemented:

provide a first E/C rework process for implementing the engineering change associated with the first E/C rework ID;

such that the MES determines a unit is at the first process step, including scanning a barcode or RFID;

provides the first E/C rework process for implementing the engineering change associated with the first E/C rework ID; and after the implementation of the first E/C rework process, assigns the second part identifier to the unit signifying that the engineering change has been implement on the unit.

10. The method of claim 9, wherein the MES further provides a unit stop function such that all units with first part identifier are directed to hold at their current process step or stop at a specified process step.

11. The method of claim 9, wherein the MES further provides a count of the units at each process step which require the engineering change.

12. The method of claim 9, wherein a second route and third process step are provided with an initial quantity of zero such that the MES transfers the unit to the second route and third process step after implementing the engineering change and decrements the quantity for the first route by one and increments the quantity for the second route by one.

13. The method of claim 9, wherein the method further provides a first field containing the number of units in the first route without the engineering change and a second field containing the number of units with the engineering change such that after implementing the engineering change on the unit, the first field for units without the engineering change is decremented and the second field for units with the engineering change is incremented.

14. The method of claim 9, wherein the method further provides:

identifying a second process step after the first process step in the first route for applying the engineering change by setting a second E/C rework ID for the second process step;

providing a second E/C rework process associated with the second E/C rework ID;

such that the MES determines a unit is at the second process step, provides the second E/C rework process associated with the second E/C rework ID, and after the second E/C rework process is implemented, assigns the unit the second part identifier.

15. The method of claim 9, wherein the MES further tracks the unit as not having the engineering change and after implementing the engineering change, tracks the unit as having the engineering change.

16. A Manufacturing Execution System (MES) for implementing an engineering change to a unit started in a manufacturing process, the MES comprising:

a computer system with work centers connected by a network, including LAN, WAN, Internet;

an MES program executing on the computer providing a step-by-step manufacturing processes where the sequence of work centers and steps are defined by a route;

the MES program further provides:

a first route to manufacture a unit with a first part identifier, including part number and revision level; without an engineering change process;

means to implement an engineering change to the unit including;

means to select a first step in the first route to implement the engineering change by setting an MES program detectable indicator for the first step;

means to provide an E/C rework process for the first step;

means to indicate for the unit after implementation that the engineering change has been implemented, including changing the first part identifier to a second part identifier;

means to provide a second route with initial quantity of zero to continue the manufacture of the unit after the E/C rework process has been implemented and decrementing the quantity of units for the first route by one and incrementing the quantity of units for the second route by one; such that:

a first quantity of units begin manufacture controlled by the MES using the first route;

an engineering change is identified and the means to implement an engineering change in the MES is processed as described;

the MES determines a unit is at the first step, including scanning a barcode or RFID and detects the indicator;

provides the E/C rework process for the first step; after the E/C rework process is implemented, indicates for the unit the implementation of the engineering change; and transfers the unit to the second route, including the decrement/increment of quantities of units for each route, to continue the manufacture of the unit after the engineering change has been implemented.

17. The MES of claim 16, wherein the MES further provides a unit stop function where specified units, including specification by part identifier or by route; are directed to hold at their current work centers or stop at a specified work center.

18. The MES of claim 16, wherein the MES further provides:
- means to select a second step after the first step in the first route for applying the engineering change by setting an MES program detectable indicator for the second step;
- means to provide a second E/C rework process associated with the second step;
- means to provide a third route with initial quantity zero to continue the manufacture of the unit after the engineering change has been implemented and decrementing the quantity of units for the first route by one and incrementing the quantity of units for the third route by one;
- such that the MES determines a unit is at the second step and detects the indicator, provides the second E/C rework process associated with the second step, and after the E/C rework process is implemented, transfers the unit to the third route, including decrement/increment of unit quantities for each route, to continue the manufacture of the unit after implementation of the engineering change.

19. The MES of claim 16 wherein the MES further provides a display of the number of units that require the engineering change at each work center of the first route and the total number of units requiring the engineering change.

* * * * *